CARD STACKER

Filed Aug. 24, 1962

2 Sheets-Sheet 1

INVENTORS
ALBERT J. ROMEO
CHARLES A. LEE

BY [signature]

ATTORNEY

June 8, 1965 A. J. ROMEO ETAL 3,188,083

CARD STACKER

Filed Aug. 24, 1962 2 Sheets-Sheet 2

INVENTORS
ALBERT J. ROMEO
CHARLES A. LEE

BY Richard Franklin

ATTORNEY 3,188,083
CARD STACKER
Albert J. Romeo, Springfield, Pa., and Charles A. Lee, Stamford, Conn., assignors to Sperry Rand Corporation, New York, N.Y., a corporation of Delaware
Filed Aug. 24, 1962, Ser. No. 219,327
5 Claims. (Cl. 271—71)

This invention relates generally to the card stacker station of a record card machine. More particularly it relates to a card stacker station particularly adapted for use with a record card machine which feeds the cards past the sensing station in a column-by-column mode.

The advantages and disadvantages connected with either of the two modes of card reading, i.e., column-by-column or row-by-row, are well known. While row-by-row reading is somewhat faster it is also somewhat more expensive since additional sensing units must be provided as well as more involved translation and/or storage circuitry. On the other hand, column-by-column reading, though less expensive, is somewhat slower and has, up to the present time, involved certain problems in connection with the output stacking arrangement for the record cards after they have been sensed. If the cards are to be stacked in the normal way, then they must be turned or have their direction altered when they leave the sensing station. This has not only involved additional and usually complicated mechanical structure but has also required additional space which, with the present trend toward compact units, has been a serious drawback.

Accordingly, it is an object of this invention to provide an improved record card stacker unit for a record card machine.

It is a further object of this invention to provide a record card stacker unit having particular application with a record card machine which passes its cards in a column-by-column mode past a sensing or punching station.

It is a further object of this invention to provide a record card stacker unit for a record card machine which can handle a large number of record cards without card bind in the used card bin.

It is a further object of this invention to provide a record card stacker unit which can be easily adapted for use with stub cards.

Other and further objects and advantages of the invention will become clear when the following description is read in conjunction with the accompanying drawings. The scope of the invention will be pointed out with particularity in the claims.

Briefly stated the invention includes a frictional drive unit which transports a card from a card sensing station where it has been read in a column-by-column mode through a path which is essentially elliptical depositing the card in an output bin on edge and in a plane which is substantially orthogonal to the plane of a card in the card sensing station. In addition the invention provides mechanism for assuring that previously read cards in the output bin do not mat, bind or press together so tightly as to prevent additional cards from being inserted in their proper order, provided the bin capacity is not exceeded.

Figure 1:
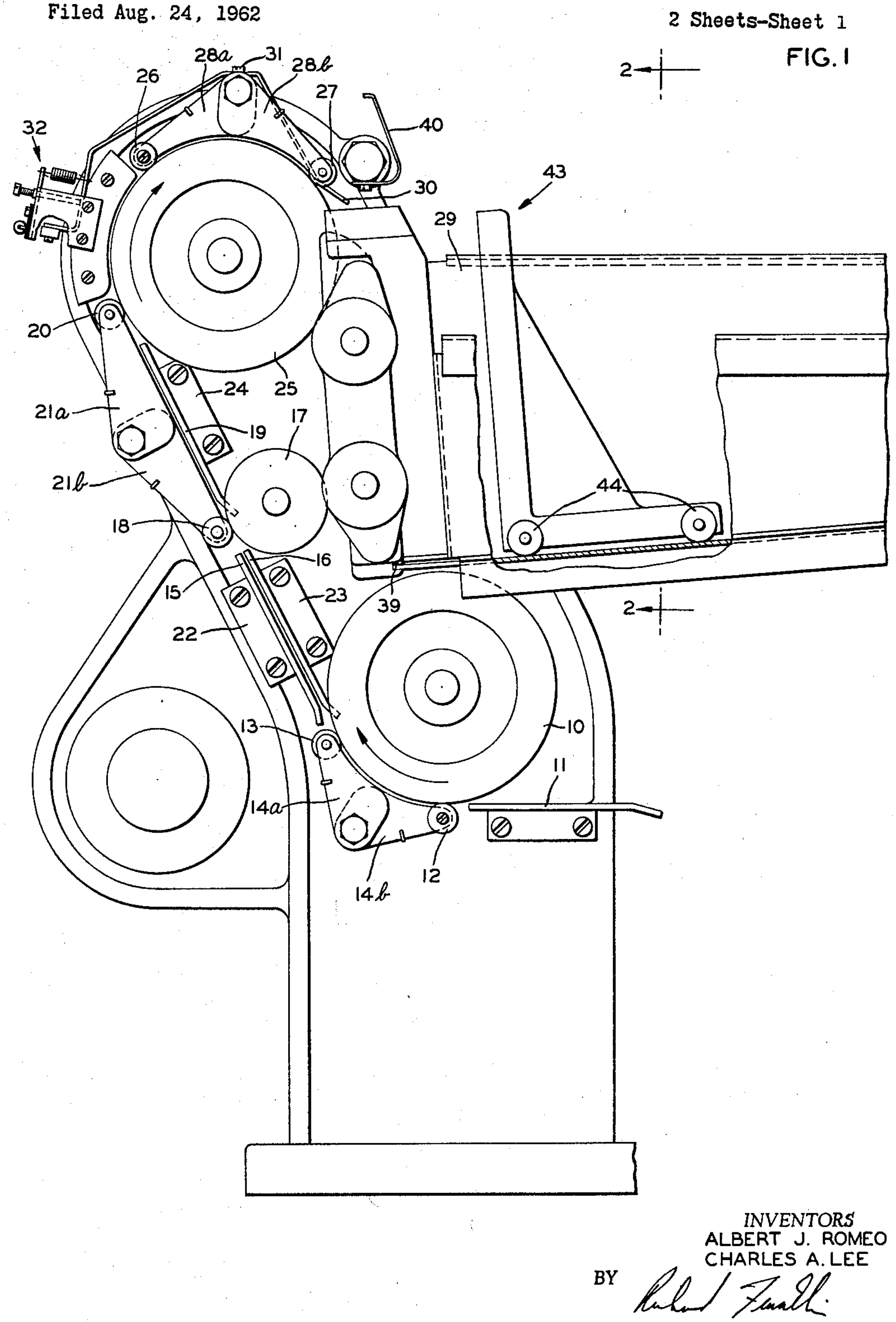
FIGURE 1 is a side view of the card stacker mechanism.

Referring now to FIGURE 1, a portion of the card stacker section of a card handling machine, such as a punched card reader, is shown. The punched card to be stacked is picked up by roller 10 from bed 11. In a particular application of this unit wherein it is employed with a card reader of the type shown and described in copending United States patent application No. 203,071, by Cogar et al., roller 10 will exert influence on a card on bed 11 before the card has cleared the card reader sensing station which is not shown. This requires, of course, that the rotational speed of roller 10 be synchronized with the card feeding mechanism of the card reader itself.

As the card leaves the sensing station under the influence of roller 10 with its column edge leading, e.g., column 1 and 46 or 45 and 90 on a 90-column card, or column 1 or 80 on an 80-column card, it is driven between roller 10 and follower rollers 12 and 13, the latter being respectively mounted on adjustable supports 14a and 14b, and thence between guide plates 15 and 16. From there the card travels between drive rollers 17 and follower roller 18 underneath guide plate 19. As is indicated, adjustable supports 14a, 14b, 21a and 21b respectively carrying follower rollers 12, 13, 18 and 20, and supports 22, 23 and 24 respectively carrying guide plates 15, 16 and 17, may be fastened to the frame of the stacker unit by any suitable fastening.

After passing beneath guide plate 19 the card to be stacked is next affected by drive roller 25 which drives the card between itself and follower rollers 20, 26 and 27, follower rollers 26 and 27 being respectively mounted on adjustable supports 28a and 28b. As the card leaves the end of the path defined by roller 25 and follower rollers 20, 26 and 27, its path is essentially tangential to roller 25 at the point adjacent follower roller 27. From here the card is free to drop into a receiving bin indicated at 29 where it remains, on end, with the other cards that have been read.

To detect a card jam in the stacker portion, a sensing finger 30 is provided, pivoted at point 31, free at the end adjacent roller 27 and at the other end capable of making an electrical connection at the switch unit indicated by reference number 32. The presence of a single card thickness beneath finger 30 is not sufficient to affect sensing finger 30. However, in the event of a jam, the presence of several thicknesses of cards beneath finger 30 at roller 27 will pivot the finger about fastening 31. In this embodiment this opens a normally closed circuit through the switch unit shown at 32.

Follower rollers 12, 13, 18, 20, 26 and 27 exist in pairs, a roller corresponding to each of the above numbered rollers being located on the other side of the card path, each pair of rollers being spaced apart slightly less than the width of a punched card. This may be more clearly seen in FIGURE 2 wherein the roller corresponding to roller 27 has been identified by the numeral 27'.

Figure 2:
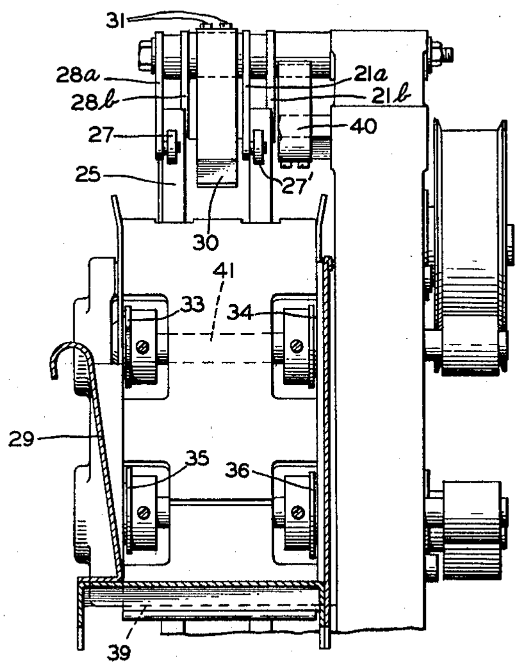
FIGURE 2 is a sectional view of a portion of the mechanism of FIGURE 1 taken along line 2—2.

Referring now to FIGURE 2 which is a sectional view of the device shown in FIGURE 1 taken along line 2—2, in this and in all subsequent figures, the same reference numerals refer to the same part of the unit. As the read cards are removed from the read station and stacked in receiving bin 29, the weight of the accumulating pile tends to pack the used cards most densely at their point of egress from the card stacker path, i.e., the portion of the bin closest to roller 25 of FIGURE 1. To insure that, regardless of the number of cards in the bin, if the capacity of the bin is not exceeded, incoming cards will be able to be freely inserted at the front of the stacker, a plurality of rollers or discs have been located so as to joggle or move the stacked cards, thus insuring looseness in the front portion of the stack and room in front of the stack for each incoming card. These discs are identified by reference numerals 33, 34, 35 and 36 of FIGURE 2, and are mounted in pairs on two shafts as at 41 of FIGURES 3 and 4.

Each of discs 33–36 have a protruding portion 33', 34',

35′ and 36′ on their circumferences which portion makes contact with the surface of the most recently stacked card preferably near the card edge so as to avoid possible card injury. The profile of two of the discs may be seen in FIGURE 3, wherein protrusion 33′ is clearly shown. From this latter figure it will be seen that the protrusions are preferably not aligned with one another, so that the joggle motion on the card stack is erratic. Protrusions 33′–36′ extend approximately ⅛ inch from the circumferences of their respective discs and this is sufficient to provide space for incoming cards. In the preferred embodiment illustrated, only protrusions 33′–36′ contact the cards and not the remainder of the circumferences of their respective discs 33–36.

These discs and protrusions have an additional function. When an incoming card is released from the influence of the frictional drive, i.e., driven rollers 10, 17 and 25, and follower rollers 12, 13, etc., at the termination of the frictional drive path adjacent follower roller 27, the angle of the card relative to cards previously stacked is chosen to facilitate rapid insertion in front of the stack. As the card slides down the front surface of the preceeding stacked card it is "scrubbed" or forced positively downward to the base of receiving bin 29 by protrusions 33′–36′ of discs 33–36.

Figure 3:
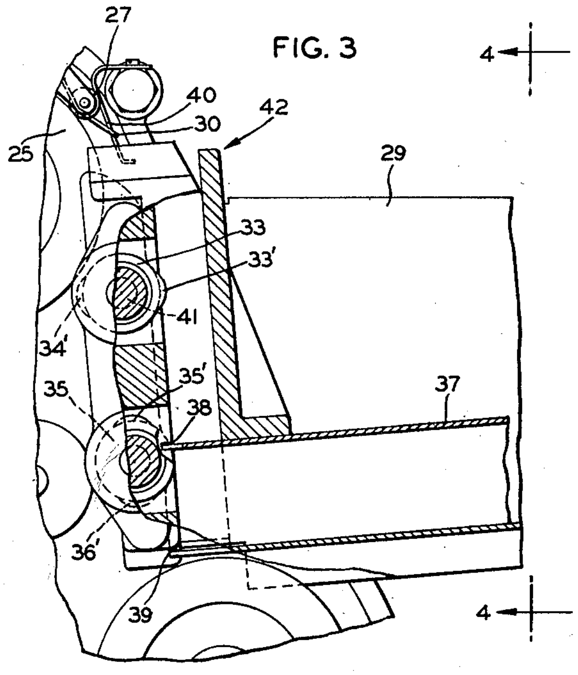
FIGURE 3 is a side view showing a portion of the mechanism of FIGURE 1 adapted for use with stub cards.
Figure 4:
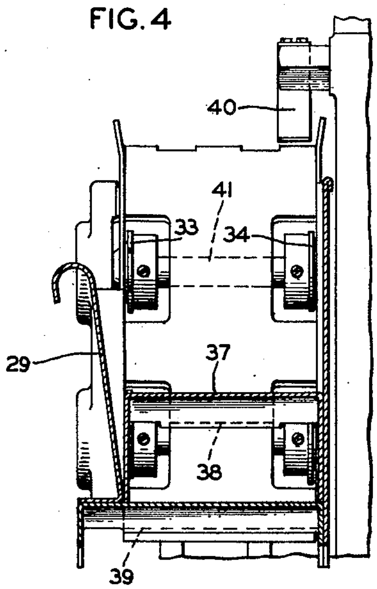
FIGURE 4 is a sectional view of the mechanism shown in FIGURE 3 taken along line 4—4.

FIGURE 3 is a view partially in section of a portion of the unit shown in FIGURE 1 which has been adapted for use in stacking stub cards. To adapt the stacker for stub cards, a platform 37, which in this embodiment is in the nature of a hollow rectangular structure, is inserted in the base of the stacker bin so that the stub cards, when stacked, will extend sufficiently up to the side wall of bin 29 to permit the operator to remove them therefrom. To facilitate this, a pair of slots identified by reference numerals 38 and 39 are provided. One of these slots also may be seen in FIGURE 2. With platform 27 in place, the angle described by a card as it leaves roller 25 at point 28 (FIGURE 1) will be incorrect. To adjust for the stub cards a guide is provided, normally held in a non-interfering position but pivotedly mounted to permit it to be used with stub cards. This structure is shown at reference numeral 40 in FIGURE 1 in its elevated or non-functioning position such as it would occur when the unit is used with normal length cards. When a stub card is used guide 40 can be swung around to occupy the position shown in FIGURES 3 and 4. Guide 40 in effect forces the stub card to describe a more acute angle relative to the stub cards previously deposited in bin 29. It will be noted in FIGURES 3 and 4 that when platform 37 is in position, discs 35 and 36 are inoperative but since the weight of these cards is less than those of a full sized card, the two discs remaining effective, i.e., 33 and 34, are sufficient. Even with a full-sized card, it is not essential that four discs be employed, though that has been found to be the preferred embodiment of the unit.

The structure indicated by reference numeral 42 at FIGURE 3 designates a simple weight which, with a suitable incline of the surface of platform 37, is sufficient, given the weight of the stub cards, to keep the cards neat and yet permit sufficient flexibility so that new cards may be inserted as described above. However, with the additional weight of a full card, a device such as that shown by reference numeral 43 in FIGURE 1 has been found to be preferred. In this latter case the weight is mounted on small rollers such as at 44.

While what has been shown and described above is believed to be the best mode and a preferred embodiment of the invention, variations and modifications may be made therein without departing from the spirit of the invention as will be clear to those skilled in the art. Accordingly, the scope of the invention is intended to be limited solely by the appending claims.

What is claimed is:

1. In a card stacker of the type having a card conveyor which transports sequentially available record cards, said cards having an information bearing sector and non-information bearing sectors adjacent said information bearing sector along the length of said record cards, said non-information bearing sectors being at the lateral edges of said record cards, said conveyor transporting said record cards from an input source to a stack, said cards being stacked on end, each succeeding card being inserted between the previously stacked cards and the termination of the card conveyor; means for preventing the accumulation of previously stacked cards from interfering with the deposition of succeeding cards comprising: a pair of rotatably driven discs mounted at the ends of a common shaft and so positioned upon said shaft so as to contact said record cards within said non-information bearing sectors, each disc having a protruding portion arranged to strike, on each disc revolution, the most recently stacked card, the discs further being arranged on said common shaft, to cause said protrusions to strike said cards in an alternate manner imparting an intermittent force against the most recently stacked card in a direction along the major axis of the card stack and downward therefrom whereby cards entering the stack are urged into alignment with said stack and a space is provided between said stack and said termination of the card conveyor sufficient to permit the next succeeding card to be placed at the end of said stack.

2. In a card stacker of the type having a card conveyor which transports sequentially available record cards, said cards having an information bearing sector and non-information bearing sectors adjacent said information bearing sector along the length of said record cards, said non-information bearing sectors being at the lateral edges of said record card, said stacker having an output stack means, said conveyor transporting said record cards from an input source to said stack means, the plane of which is substantially orthogonal to the plane in which such cards are available at said input source, said cards being stacked on end, each succeeding card being inserted between the previously stacked cards and the termination of the card conveyor; means for preventing the accumulation of previously stacked cards from interfering with the deposition of succeeding cards comprising: a pair of rotatably driven discs mounted at the ends of a common shaft and so positioned upon said shaft so as to contact said record cards within said non-information bearing sectors, each disc having a protruding portion arranged to strike, on each disc revolution, the most recently stacked card within said non-information bearing segments of said cards, the discs further being arranged on said common shaft, to cause said protrusions to strike said cards in an alternate manner imparting an intermittent force against the most recently stacked card in a direction along the major axis of the card stack and downward therefrom whereby cards entering the stack are urged into alignment with said stack and a space is provided between said stack and said termination of the card conveyor sufficient to permit the next succeeding card to be placed at the end of said stack.

3. A stacker as claimed in claim 2 further including platform means insertable at the base of said stack for adapting said stacker to handle cards of a length different than the length of a normal card.

4. In a card stacker of the type having a card conveyor which transports sequentially available record cards, said cards having an information bearing sector and non-information bearing sectors, said stacker having an output stack means, said conveyor transporting said record cards from an input source to said stack means, the plane of which is substantially orthogonal to the plane on which such cards are available at said input source, said cards being stacked on end, each succeeding card being inserted between the previously stacked cards and the termination of the card conveyor; means for preventing the accumulation of previously stacked cards from interfering with the deposition of succeeding cards comprising: a first rotatably driven shaft having mounted thereon a first and a second disc; a second rotatably driven shaft having mounted thereon a third and a fourth disc, said first and second shafts being placed in sequence along said card conveyor, each of said first, second, third and fourth discs having a protruding portion on its periphery, said protrusions being arranged to permit the protrusion on said first and fourth discs to strike diagonal corners of the most recently stacked card within the non-information bearing segments and then the protrusions on said second and third discs to strike the opposite diagonal corners of the most recently stacked card within the non-information bearing segments, said protrusions on said first and fourth discs and said second and third discs continuing to strike said most recently stacked card in an alternate manner on each disc revolution imparting an intermittent force against said most recently stacked card in a direction along the major axis of the card stack and downward therefore whereby cards entering the stack are urged into alignment with said stack and a space is provided between said stack and said termination of the card conveyor sufficient to permit the next succeeding card to be placed at the end of the said stack.

5. A stacker as claimed in claim 4 further including platform means insertable at the base of said stack for adapting said stacker to handle cards of a length different than the length of a normal card, said platform means covering said third and fourth discs and preventing the protrusions on said third and fourth discs from striking said most recently stacked card.

References Cited by the Examiner

UNITED STATES PATENTS

| | | | |
|---|---|---|---|
| 467,682 | 1/92 | Dolphin | 271—87 |
| 538,019 | 4/95 | Ethridge et al. | 271—87 |
| 857,990 | 6/07 | Gasman et al. | 271—87 |
| 1,538,999 | 5/25 | Mitchell et al. | 271—87 |
| 2,251,221 | 7/41 | Cleven | 271—87 |
| 2,844,373 | 7/58 | Van Marle | 271—87 |

ROBERT B. REEVES, *Primary Examiner.*

SAMUEL F. COLEMAN, *Examiner.*